United States Patent
Patterson et al.

(10) Patent No.: US 7,708,919 B2
(45) Date of Patent: May 4, 2010

(54) SPRUE REMOVAL IN AN INJECTION MOLDING MACHINE

(75) Inventors: John J. Patterson, Cortland, OH (US); Leonard J. Turco, Hermitage, PA (US); Michael T. Nemet, Newton Falls, OH (US)

(73) Assignee: Delphi Technologies, Inc., Troy, MI (US)

( * ) Notice: Subject to any disclaimer, the term of this patent is extended or adjusted under 35 U.S.C. 154(b) by 168 days.

(21) Appl. No.: 12/151,653

(22) Filed: May 8, 2008

(65) Prior Publication Data

US 2009/0278273 A1    Nov. 12, 2009

(51) Int. Cl.
*B29C 45/27* (2006.01)
*B29C 45/80* (2006.01)

(52) U.S. Cl. ............... 264/40.5; 264/161; 264/334; 425/139; 425/556; 425/441

(58) Field of Classification Search ............... 425/139, 425/150, 556, 441, 444; 264/40.5, 161, 334
See application file for complete search history.

(56) References Cited

U.S. PATENT DOCUMENTS

| | | | | |
|---|---|---|---|---|
| 3,669,592 A * | 6/1972 | Miller | ...... | 425/155 |
| 4,124,352 A * | 11/1978 | Pasch | ...... | 425/556 |
| 4,204,824 A * | 5/1980 | Paradis | ...... | 425/436 R |
| 4,732,554 A * | 3/1988 | Hellmann | ...... | 425/139 |
| 4,781,571 A * | 11/1988 | Heindl et al. | ...... | 425/556 |
| 5,250,239 A * | 10/1993 | Herbst | ...... | 264/40.5 |
| 6,537,055 B2 * | 3/2003 | Adachi | ...... | 425/315 |

* cited by examiner

*Primary Examiner*—Jill L Heitbrink
(74) *Attorney, Agent, or Firm*—Thomas N. Twomey

(57) ABSTRACT

A method of removing solidified sprue plastic from an injection molding machine uses a picker assembly that includes an end-effector with a gripper. The injection molding machine has a stationary platen with a first mold, and has a moveable platen with a second mold. The method includes moving the gripper in a direction that is generally perpendicular to a direction that the second mold moves while the first mold and the second mold are opening. The method also includes grabbing the solidified sprue plastic before the first mold and the second mold reach a fully open position.

19 Claims, 2 Drawing Sheets

SPRUE REMOVAL IN AN INJECTION MOLDING MACHINE

FIELD OF THE INVENTION

This invention relates generally to injection molding machines, and more particularly to removing solidified sprue plastic from injection molding machines.

BACKGROUND OF THE INVENTION

Injection molding machines can be used to form plastic parts by first injecting molten plastic into a cavity that is defined by a pair of molds. The molten plastic ordinarily travels through a sprue (including associated runners) and to the cavity. Once the plastic solidifies, the pair of molds is separated, and the part and the now solidified sprue plastic (e.g., junk plastic) are removed. Sometimes a picker assembly removes the solidified sprue plastic before the pair of molds close again.

SUMMARY OF THE INVENTION

One embodiment of the invention may include a method of removing solidified sprue plastic from an injection molding machine. The method may include providing a picker assembly that itself includes an end-effector having a gripper. The method may also include providing the injection molding machine with a stationary platen that has a first mold, and providing the injection molding machine with a moveable platen that has a second mold. The method may further include moving the gripper in a direction that is generally perpendicular to a direction of the movement of the second mold when the first mold and the second mold are in the midst of opening. And the method may include grabbing the solidified sprue plastic before the first mold and the second mold reach a fully open position.

One embodiment of the invention may include an assembly that includes an injection molding machine, a picker assembly, and a controller. The injection molding machine has a stationary platen with a first mold, and has a moveable platen with a second mold. The injection molding machine also has a position sensor that monitors the position of the second mold. The picker assembly includes an end-effector having a gripper. The picker assembly also includes a first servo motor that drives the gripper in a direction that is generally parallel to a direction of the movement of the second mold when the first mold and the second mold are in the midst of opening. The picker assembly also includes a second servo motor that drives the gripper in a direction that is generally perpendicular to the direction of the movement of the second mold when the first mold and the second mold are in the midst of opening. And the controller commands the movement of the gripper based, at least in part, on the monitored position of the second mold.

One embodiment of the invention may include a method of controlling the movement of a picker assembly while the picker assembly is removing solidified sprue plastic from an injection molding machine. The picker assembly includes an end-effector having a gripper, and the injection molding machine has a stationary platen with a first mold and has a moveable platen with a second mold. The method includes monitoring, or otherwise tracking, the movement of the moveable platen when the first mold and the second mold are opening. The method may also include moving the gripper based, at least in part, on the monitored movement of the moveable platen in order to help remove the solidified sprue plastic from the injection molding machine.

DETAILED DESCRIPTION OF THE PREFERRED EMBODIMENTS

Figure 1:
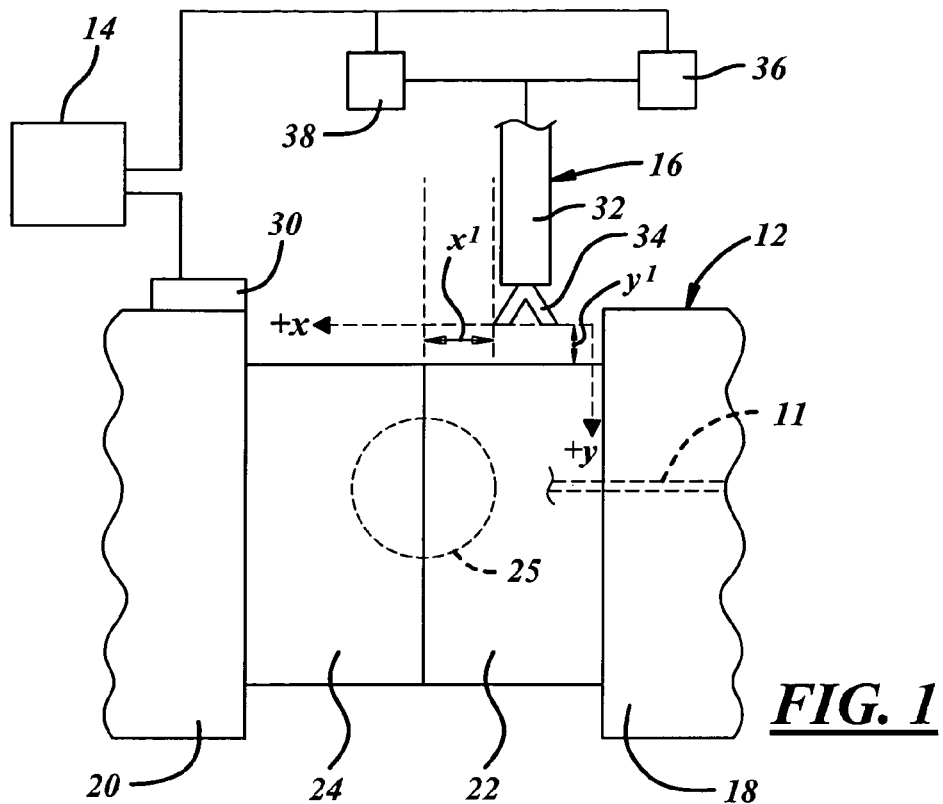
FIG. 1 is schematic showing a fragmented injection molding machine and a fragmented picker assembly.

Referring in more detail to the drawings, the figures show an embodiment of a method of, and a system used for, removing a solidified sprue plastic 10 out of an injection molding machine 12. A controller 14 commands a picker assembly 16 to grab the solidified sprue plastic 10 while the injection molding machine 12 is opening its pair of molds to eject a part, so that the injection molding machine does not have to open the molds fully and pause before grabbing the solidified sprue plastic. Instead the injection molding machine 12 opens and closes its molds in a continuous and fluid motion during a single injection molding cycle. In this way and others, the overall injection molding cycle time (e.g., measured from when the injection molding machine is initially closed, plastic injected, then opened to eject the associated part, and closed again to form another part) is reduced for a single cycle by limiting, or altogether eliminating, intrusion time of the picker assembly 16.

The injection molding machine 12 can be used to manufacture a plastic part, such as an automotive part. The injection molding machine 12 can have various orientations and types such as, but not limited to, a vertical or horizontal orientation and a hydraulic, an electric, or a hybrid type. The injection molding machine 12 can also be a small tonnage press having a clamping force in a range of about 55 to 300 tons. In the example shown in FIG. 1, the injection molding machine 12 has a stationary platen 18 that does not move during the injection molding cycle, and a moveable platen 20 that moves during the overall injection molding cycle. The stationary platen 18 carries a first mold 22, and the moveable platen 20 carries a second mold 24 (e.g., a 2-plate tool). The first mold 22 forms and defines a first mold face 26, and the second mold 24 forms and defines a second mold face 28. A position sensor, such as a linear encoder 30, can be attached to the moveable platen 20 or to the second mold 24. The linear encoder 30 senses, or otherwise tracks, the position of the moveable platen 20 or the second mold 24. The data is communicated and conveyed to the controller 14, which in turn determines the velocity and the acceleration of the moveable platen 20 or the second mold 24.

In an example injection molding cycle, the first mold 22 and the second mold 24 begin in a fully closed position as shown in FIG. 1 in order to form a closed cavity 25. Molten plastic is injected (e.g., forced) through a sprue 11 and its associated runners and channels, and flows to the cavity 25. Once the cavity 25 is filled, the plastic solidifies to form the particular plastic part, and solidifies to form the solidified sprue plastic 10. The solidified sprue plastic 10 may also include solidified plastic in the associated runners and channels which may be defined in the molds, the platens, or both.

Figure 2:
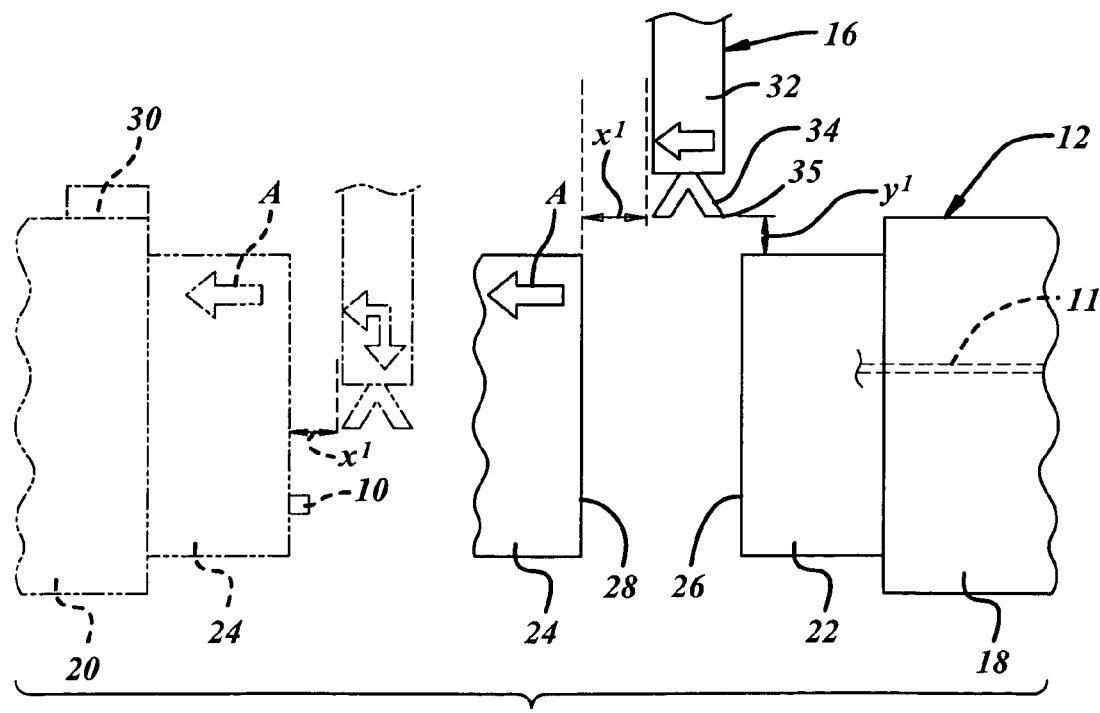
FIG. 2 is a schematic showing certain movements of the injection molding machine and the picker assembly of FIG. 1.

The first mold 22 and the second mold 24 then separate to open and expose the cavity 25. The moveable platen 20 moves in a direction A which, in FIG. 2, is shown as a horizontal direction of draw. In different examples, the particular plastic part can then be ejected out of the first mold 22 or the second mold 24 by ejector pins, an air ejection system, a stripper plate (e.g., a 3-plate tool), or the like. The solidified sprue plastic 10 is separated from the part by the ejector mechanical system or a stripper plate, depending on the case. The first mold 22 and the second mold 24 close again, and another injection molding cycle begins.

The picker assembly 16 is used to remove, such as by grabbing, the solidified sprue plastic 10 during an injection molding cycle, and transport the solidified sprue plastic to a location for reprocessing (e.g., to a grinder). The picker assembly 16 can have various constructions, arrangements, and operations; and can be provided by various companies including Comptrol Incorporated of Cleveland, Ohio, U.S.A. (www.comptrolinc.com). In the example of FIG. 1, the picker assembly 16 is robotic and is equipped with an end-effector 32 terminating in a gripper 34. A first servo motor 36 drives the end-effector 32 and the gripper 34 in a horizontal direction (x-axis), as shown in the figure, or in a direction that is parallel to the direction A; and a second servo motor 38 drives the end-effector and the gripper in a vertical direction (y-axis) or in a direction that is perpendicular to the direction A. The servo motors may be of various types including, but not limited to, electric (e.g., A.C.), hydraulic, pneumatic, or magnetic. Another servo motor (not shown) can drive the end-effector 32 and the gripper 34 in a third direction (e.g., z-axis). The first and second servo motors 36, 38 can be equipped with position sensors such as linear encoders or pulse counters to sense the position of the end-effector 32 and the gripper 34, and help determine the speed and acceleration of the end-effector and the gripper in the horizontal and vertical directions. One or more brakes (not shown) can also be provided to stop or slow the movement of the picker assembly 16 in a particular direction.

The controller 14 instructs the movement and other automated functions of the picker assembly 16. The controller 14 receives data signals from the linear encoder 30, and makes determinations and calculations based on that data. The controller 14 also receives data signals from the picker assembly 16, including the respective position sensors. The controller 14 commands the movement of the gripper 34 based on at least some of the received data. For example, the gripper 34 moves at the same speed and acceleration as the second mold 24 while the injection molding machine 12 is opening, and remains at a fixed distance $(x^1)$ away from the second mold face 28; this is partly based on data received from the linear encoder 30. The gripper 34 also begins to move in the direction that is perpendicular to the direction A once a back end 35 of the gripper 34 clears, or otherwise travels past, the first mold 22 and is no longer in danger of running into the first mold; this is partly based on data received from the linear encoder 30 and from the picker assembly 16. As one more example, the gripper 34 begins at the start position that is a fixed distance $(y^1)$ away from the first mold 22; this is partly based on data received from the linear encoder 30 and from the picker assembly 16.

In the example shown in FIGS. 1 and 2, the controller 14 is a single main controller that controls some functions of both the injection molding machine 12 and the picker assembly 16. The controller 14 can also include other controllers including, for example, a controller dedicated to the injection molding machine 12 and a controller dedicated to the picker assembly 16; in this case, the main controller would communicate with the secondary or auxiliary controllers. The controller 14 can be a programmable logic controller (PLC). Though not shown, the controller 14 can include a human-machine-interface (HMI) so that an operator can input and read certain data.

The controller 14 instructs the functionality of the picker assembly 16 by executing a program consisting of, among other things, a number of subroutines that is loaded onto a computer readable medium or other suitable memory or storage device. The program can be executed with the help of software including the RSLogix 5000 software provided by Rockwell Automation of Milwaukee, Wis., U.S.A. (www.rockwellautomation.com). One way of describing positions and movements of the injection mold machine 12 and the picker assembly 16—both in terms of programming and explanation—is by a Cartesian coordinate system. In the example shown, a datum point, or origin, can be located at the top edge of the stationary platen 18, where the x-axis would be parallel to the direction A, and the y-axis would be perpendicular to the direction A. From the datum point, movement along the x-axis and in the direction A is a positive x-movement, and movement along the y-axis and downward (as shown in FIGS. 1 and 2) is a positive y-movement.

Figure 3:
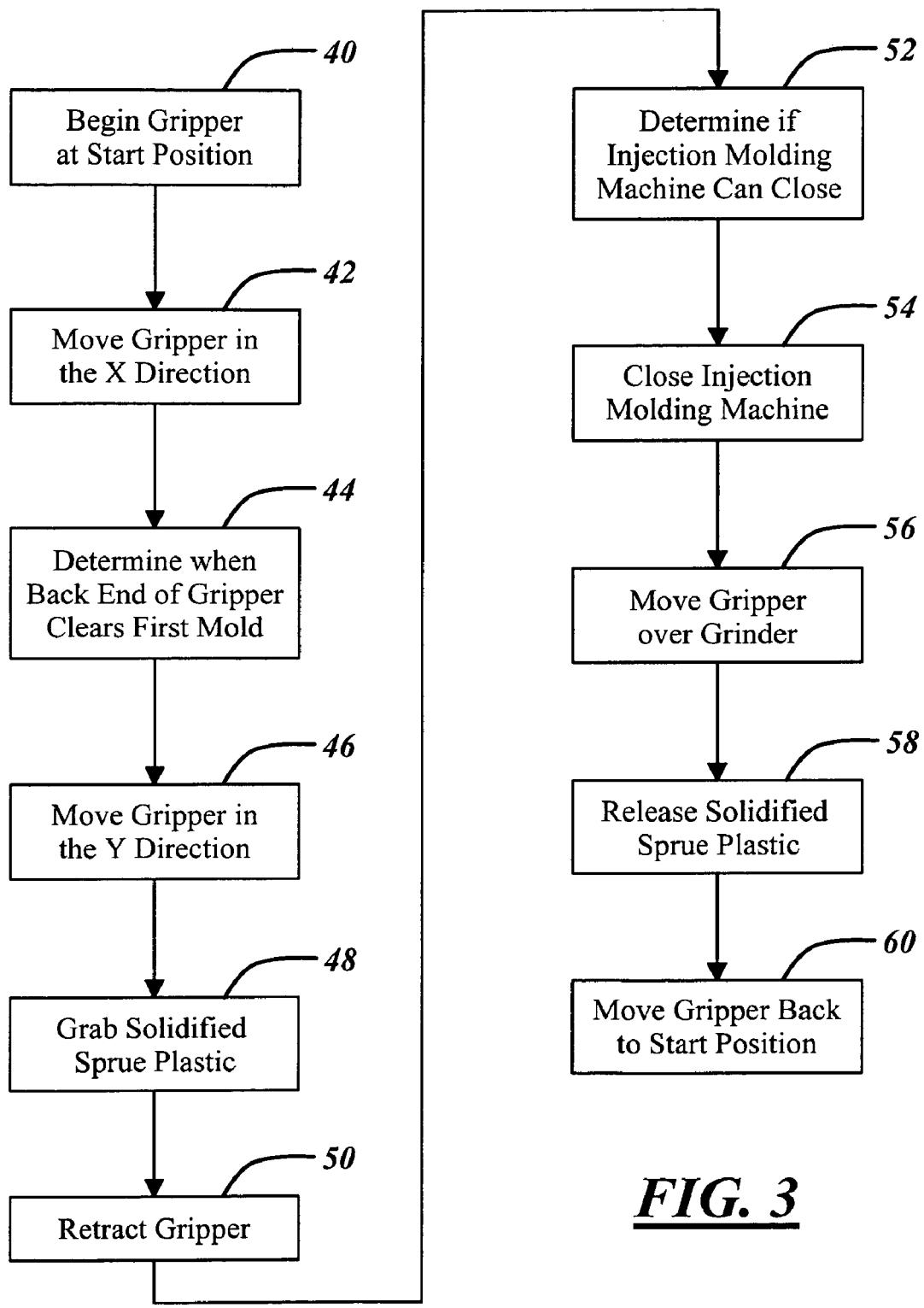
FIG. 3 is a flow chart representing steps of a method of removing a solidified sprue plastic from an injection molding machine.

In the method flow chart of FIG. 3, and in a step 40, the gripper 34 begins at the start position. The start position is where the gripper 34 is located when the injection molding machine 12 is in the fully closed position as shown in FIG. 1. The gripper 34 is at the fixed distance $(x^1)$ away from the second mold face 28, and is at the fixed distance $(y^1)$ away from the first mold 22. In one example, the fixed distance $(y^1)$ may be about 1 mm. In a step 42, the first servo motor 36 is enabled, and the gripper 34 is moved in the positive x-direction once the second mold 24 begins to move when the injection molding machine initially opens. The gripper 34 and the x-axis are slaved to the movement of the second mold 24 in the positive x-direction in the sense that the gripper 34 moves at the same acceleration and same speed as the second mold, thus maintaining the fixed distance $(x^1)$ away from the second mold face 28. The gripper 34 can be slaved to the movement of the second mold 24 and thus maintain the fixed distance $(x^1)$ at least until the gripper grabs the solidified sprue plastic 10. In a step 44, the controller 14 determines when the back end 35 of the gripper 34 clears the first mold 22 and the first mold face 26. This determination can be partly based on data received from the position sensor of the first servo motor 36, and partly based on the particular dimensions of the gripper 34 and the particular dimensions of the first mold 22. In a step 46, the second servo motor 38 is enabled, and the gripper 34 is moved in the positive y-direction once the controller 14 determines that the gripper has cleared the first mold 22 (see, for example, FIG. 2 in phantom). The gripper 34 maintains the fixed distance $(x^1)$ while it moves in the positive y-direction, thus the gripper 34 is moving simultaneously in the x and y directions and to a position where the gripper can grab the solidified sprue plastic 10.

In a step 48, the gripper 34 grabs the solidified sprue plastic 10. The picker assembly's grabbing movement may be synchronized with the sprue ejection in the case where the sprue is ejected. That is, the gripper 34 catches the solidified sprue plastic 10 as soon as the solidified sprue plastic is being ejected while the injection molding machine 12 is opening. The gripper 34 can grab the solidified sprue plastic 10 including any associated solidified plastic in the runners and channels. In a step 50, the gripper 34 retracts out of the spaced defined between the first and second mold 22, 24 while carrying the solidified sprue plastic 10. The gripper 34 may, though need not, retract completely out of the injection molding machine 12 before the injection molding machine reaches its fully open position. In this step, the gripper 34 does not necessarily maintain the fixed distances ($x^1$) and ($y^1$). In a step 52, the controller 14 determines if the injection molding machine 12 can begin closing. This determination can be partly based on data received from the position sensor of the second servo motor 38. For example, if the position sensor of the second servo motor 38 indicates that the gripper 34 is located completely out of the injection molding machine 12, then the injection molding machine will begin closing. In another example, the injection molding machine 12 can begin closing before the gripper 34 is located outside of the first and second molds 22 and 24. In a step 54, the injection molding machine 12 is closed. In one example, since the gripper 34 retracts completely out of the injection molding machine 12 before the injection molding machine is fully open, the injection molding machine can go from fully open to fully closed in a fluid and continuous motion without pausing open. In a step 56, the gripper 34 is moved over the grinder; and in a step 58, the solidified sprue plastic 10 is released and dropped into the grinder for recycling and reprocessing. In a step 60, the gripper 34 is moved back to the start position, and another injection molding cycle can begin again.

In the above method, the injection molding cycle time is reduced as compared to other picker assemblies by virtue of, among other things, communication between the picker assembly 16 and the injection molding machine 12. For example, in a 20 second total injection molding cycle time, the above method may eliminate 2.5 seconds, and thus reduce the total injection molding cycle time by 12.5%.

Though shown and described as having certain steps in a certain order, the method need not necessarily have each and every step, and need not necessarily be performed in the certain order. For example, injection molding machines of different orientations and of different types may have additional steps not described or shown.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A method of removing a solidified sprue plastic from an injection molding machine, the method comprising:
   providing a picker assembly including an end-effector with a gripper;
   providing the injection molding machine with a stationary platen having a first mold, and with a moveable platen having a second mold;
   moving the gripper in a direction that is generally perpendicular to the movement of the second mold when the first mold and the second mold are opening; and
   grabbing the solidified sprue plastic before the first mold and the second mold move to a fully open position.

2. The method of claim 1 further comprising grabbing the solidified sprue plastic from the first mold.

3. The method of claim 1 further comprising providing the injection molding machine with a stripper plate.

4. The method of claim 1 further comprising:
   providing the second mold with a mold face;
   beginning the gripper at a start position where the first mold and the second mold are in a fully closed position, the gripper being a fixed distance from the mold face at the start position;
   moving the gripper in a direction that is generally parallel to the movement of the second mold when the first mold and the second mold are opening; and
   maintaining the fixed distance between the gripper and the mold face while the gripper is moving in the parallel direction.

5. The method of claim 4 further comprising maintaining the fixed distance until the gripper grabs the solidified sprue plastic.

6. The method of claim 4 further comprising maintaining the fixed distance while moving the gripper in the direction that is generally perpendicular to the movement of the second mold, and maintaining the fixed distance until the gripper grabs the solidified sprue plastic.

7. The method of claim 1 wherein the second mold continuously moves from a fully closed position, to a fully open position, and back to the fully closed position.

8. The method of claim 1 further comprising:
   moving the gripper in a direction that is generally parallel to the movement of the second mold when the first mold and the second mold are opening; and
   moving the gripper in the perpendicular direction once the gripper clears the first mold in the parallel direction.

9. The method of claim 1 further comprising:
   monitoring the movement of the moveable platen when the first mold and the second mold are opening; and
   moving the gripper based on the monitored movement of the moveable platen.

10. The method of claim 1 further comprising providing the injection molding machine having a clamping force in a range of about 55 to 300 tons.

11. A method of controlling the movement of a picker assembly when removing a solidified sprue plastic from an injection molding machine, the method comprising:
    providing the picker assembly with an end-effector having a gripper;
    providing the injection molding machine with a stationary platen having a first mold, and with a moveable platen having a second mold;
    monitoring the movement of the moveable platen when the second mold is moving;
    moving the gripper based on the monitored movement of the moveable platen to remove the solidified sprue plastic from the injection molding machine;
    moving the gripper in a direction that is generally perpendicular to the movement of the second mold when the first mold and the second mold are opening; and
    grabbing the solidified sprue plastic before the first mold and the second mold move to a fully open position.

12. The method of claim 11 further comprising:
    providing the second mold with a mold face;
    beginning the gripper at a start position where the first mold and the second mold are in a fully closed position, the gripper being a fixed distance from the mold face at the start position;

moving the gripper in a direction that is generally parallel to the movement of the second mold when the first mold and the second mold are opening; and maintaining the fixed distance between the gripper and the mold face while the gripper is moving in the parallel direction.

13. The method of claim 12 further comprising maintaining the fixed distance until the gripper grabs the solidified sprue plastic.

14. The method of claim 12 further comprising maintaining the fixed distance while moving the gripper in a direction that is generally perpendicular to the movement of the second mold when the first mold and the second mold are opening, and maintaining the fixed distance until the gripper grabs the solidified sprue plastic.

15. The method of claim 11 further comprising:

moving the gripper in a direction that is generally parallel to the movement of the second mold when the first mold and the second mold are opening;

moving the gripper in a direction that is generally perpendicular to the movement of the second mold when the first mold and the second mold are opening; and moving the gripper in the perpendicular direction once the gripper clears the first mold in the parallel direction.

16. The method of claim 11 further comprising providing the injection molding machine having a clamping force in a range of about 55 to 300 tons.

17. An assembly comprising:

an injection molding machine having a stationary platen with a first mold, and having a moveable platen with a second mold, the injection molding machine including a position sensor to monitor the position of the second mold;

a picker assembly including an end-effector with a gripper, and including a first servo motor to drive the gripper in a direction that is generally parallel to the movement of the second mold when the first mold and the second mold are opening, and including a second servo motor to drive the gripper in a direction that is generally perpendicular to the movement of the second mold when the first mold and the second mold are opening; and a controller communicating with the position sensor and commanding the movement of the gripper based on the monitored position of the second mold causing the gripper to grap the solidified sprue plastic before the first mold and the second mold move to a fully open position.

18. The assembly of claim 17 wherein the injection molding machine has a clamping force in a range of about 55 to 300 tons.

19. The assembly of claim 18 wherein the position sensor is a linear encoder that is mounted on the moveable platen.

* * * * *